(12) United States Patent  (10) Patent No.: US 8,706,546 B2
Anderson et al.  (45) Date of Patent: Apr. 22, 2014

(54) SELECTING AND/OR SCORING CONTENT-RELEVANT ADVERTISEMENTS

(75) Inventors: Darrell Anderson, Mountain View, CA (US); Alexander Paul Carobus, Mountian View, CA (US); Giao Nguyen, Sacramento, CA (US); Narayanan Shivakumar, San Jose, CA (US)

(73) Assignee: Google Inc., Mountain View, CA (US)

( * ) Notice: Subject to any disclaimer, the term of this patent is extended or adjusted under 35 U.S.C. 154(b) by 2071 days.

(21) Appl. No.: 11/184,053

(22) Filed: Jul. 18, 2005

(65) Prior Publication Data

US 2007/0016473 A1  Jan. 18, 2007

(51) Int. Cl.
*G06Q 30/00* (2012.01)
(52) U.S. Cl.
USPC .......................................................... 705/14
(58) Field of Classification Search
USPC .......................................................... 705/14
See application file for complete search history.

(56) References Cited

U.S. PATENT DOCUMENTS

| | | | |
|---|---|---|---|
| 6,269,361 B1 | 7/2001 | Davis et al. | |
| 7,373,599 B2 | 5/2008 | McElfresh et al. | |
| 2003/0046161 A1 | 3/2003 | Kamangar et al. | |
| 2005/0055271 A1* | 3/2005 | Axe et al. | 705/14 |
| 2005/0091106 A1 | 4/2005 | Reller et al. | |
| 2005/0096979 A1* | 5/2005 | Koningstein | 705/14 |
| 2006/0230053 A1* | 10/2006 | Eldering | 707/101 |
| 2006/0287920 A1* | 12/2006 | Perkins et al. | 705/14 |
| 2012/0095827 A1* | 4/2012 | Vora et al. | 705/14.49 |

OTHER PUBLICATIONS

Bangalore, Srinivas and Rambow, Owen, Exploiting a Probabilistic Hierarchical Model for Generation. In: Proceedings of the 18th Conference on Computational Linguistics (COLING '2000), Jul. 31-Aug. 4, 2000, (pp. 42-48).*
PCT/ISA/220, "Notification of Transmittal of the International Search Report and the Written Opinion of the International Searching Authority, or the Declaration" for PCT/US06/27900, mailed Mar. 5, 2007 (1 pg.).
PCT/ISA/210, "International Search Report" for PCT/US06/27900, mailed Mar. 5, 2007 (2 pgs.).
PCT/ISA/237, "Written Opinion of the International Searching Authority" for PCT/US06/27900, mailed Mar. 5, 2007 (3 pgs.).
U.S. Appl. No. 10/314,427 titled "Methods and Apparatus for Serving Relevant Advertisements", filed Dec. 6, 2002.
U.S. Appl. No. 10/375,900 titled "Serving Advertisements based on Content", filed Feb. 26, 2003.
U.S. Appl. No. 10/676,571 titled Methods and Apparatus for Characterizing Documents Based on Cluster Related Words, filed Sep. 30, 2003.

* cited by examiner

*Primary Examiner* — Alvin L Brown
(74) *Attorney, Agent, or Firm* — Lerner, David, Littenberg, Krumholz & Mentlik, LLP

(57) ABSTRACT

Ads eligible to be served with a document (for example, because they are relevant to the document) may each be scored using a price parameter associated with the ad and an indication of relevancy of the ad to the document. The indication of relevancy of the ad to the document may be based on an ordinal ranking of a relevancy criteria of the document used to select the ad, and/or a value of a relevancy criteria of the document used to select the ad. The eligible ads may be determined by obtaining relevancy criteria for the document and selecting ads using at least some of the obtained relevancy criteria. The ads may be selected, and perhaps filtered, in a distributed manner.

21 Claims, 4 Drawing Sheets

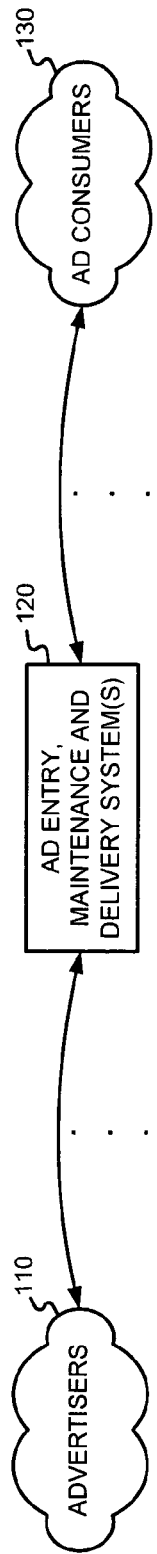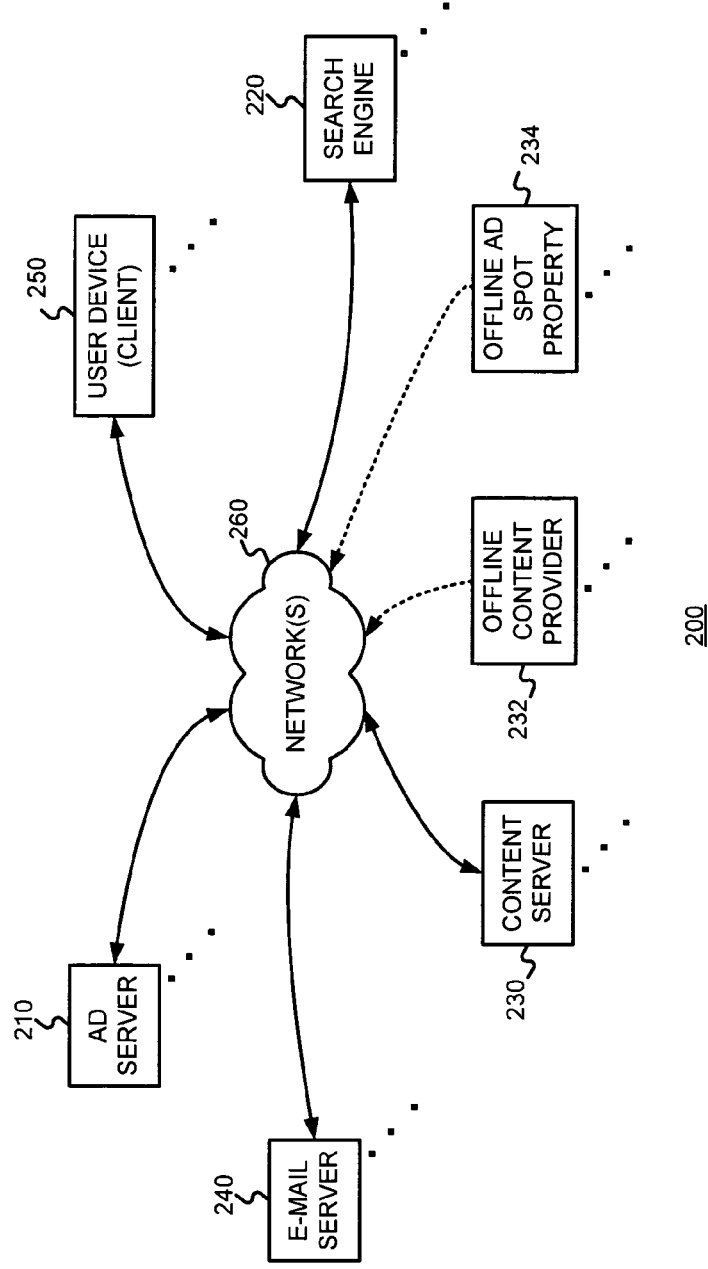

SELECTING AND/OR SCORING CONTENT-RELEVANT ADVERTISEMENTS

§1. BACKGROUND OF THE INVENTION

§1.1 Field of the Invention

The present invention concerns advertising, such as online advertising for example. In particular, the present invention concerns selecting and/or scoring content-relevant advertisements ("ads").

§1.2 Background Information

Advertising using traditional media, such as television, radio, newspapers and magazines, is well known. Unfortunately, even when armed with demographic studies and entirely reasonable assumptions about the typical audience of various media outlets, advertisers recognize that much of their advertising budget is simply wasted. Moreover, it is very difficult to identify and eliminate such waste.

Recently, advertising over more interactive media has become popular. For example, as the number of people using the Internet has exploded, advertisers have come to appreciate media and services offered over the Internet as a potentially powerful way to advertise.

Interactive advertising provides opportunities for advertisers to target their ads to a receptive audience. That is, targeted ads are more likely to be useful to end users since the ads may be relevant to a need inferred from some user activity (e.g., relevant to a user's search query to a search engine, relevant to content in a document requested by the user, etc.). Query keyword targeting has been used by search engines to deliver relevant ads. For example, the AdWords advertising system by Google Inc. of Mountain View, Calif. (referred to as "Google"), delivers ads targeted to keywords from search queries. Similarly, content targeted ad delivery systems have been proposed. For example, U.S. patent application Ser. No. 10/314,427 (incorporated herein by reference and referred to as "the '427 application"), titled "METHODS AND APPARATUS FOR SERVING RELEVANT ADVERTISEMENTS", filed on Dec. 6, 2002 and listing Jeffrey A. Dean, Georges R. Harik and Paul Buchheit as inventors; and Ser. No. 10/375,900 (incorporated by reference and referred to as "the '900 application"), titled "SERVING ADVERTISEMENTS BASED ON CONTENT," filed on Feb. 26, 2003 and listing Darrell Anderson, Paul Buchheit, Alex Carobus, Claire Cui, Jeffrey A. Dean, Georges R. Harik, Deepak Jindal and Narayanan Shivakumar as inventors, describe methods and apparatus for serving ads relevant to the content of a document, such as a Web page for example. Content targeted ad delivery systems, such as the AdSense advertising system by Google for example, have been used to serve ads on Web pages.

As can be appreciated from the foregoing, serving ads relevant to concepts of text in a text document is useful because such ads presumably concern a current user interest. Consequently, such online advertising has become increasingly popular. However, such content-targeted ad delivery systems can be improved. For example, the '900 application describes how so-called "targeting criteria" (or simply "criteria", whether used in the singular or plural form), used to look up relevant ads, may be determined in an exemplary embodiment. Specifically, the '900 application describes that an off-line (perhaps nightly) dump of a complete ads database is used to generate an index that maps topics (e.g., a PHIL cluster identifiers) to a set of matching ad groups. This may be done using one or more of (i) a set of serving constraints (targeting criteria) within the ad group, (ii) text of the ads within the ad group, (iii) content on the advertiser's Web site, etc. U.S. Provisional Application Ser. No. 60/416,144 (incorporated herein by reference and referred to as "the '144 application"), titled "Methods and Apparatus for Probabilistic Hierarchical Inferential Learner" filed on Oct. 3, 2002 and U.S. patent application Ser. No. 10/676,571 (referred to as "the '571 application" and incorporated herein by reference), titled "Methods and Apparatus for Characterizing Documents Based on Cluster Related Words," filed on Sep. 30, 2003 and listing Georges Harik and Noam Shazeer as inventors describe exemplary ways, that may be used in a manner consistent with the principles of the present invention, to determine one or more concepts or topics of information.

The '900 application further describes that a document may be associated with one or more ads using a document identifier (e.g., a URL) to determine one or more ads. For example, the document information may have been processed to generate relevance information, such as a cluster (e.g., a PHIL cluster), a topic, etc. The document clusters may then be used as query terms in a large OR query to an index that maps topics (e.g., PHIL cluster identifiers) to a set of matching ad groups, via the index that maps topics to ad groups.

The results of this query may then be used as first cut set of candidate criteria. More specifically, the candidate ad groups may then be used to determine an actual information retrieval (IR) score for each ad group summarizing how well the criteria information plus the ad text itself matches the document relevance information. Estimated or known performance parameters (e.g., selection rates, conversion rates, etc.) for the ad group may be considered in helping determine the best scoring ad group(s). Targeting criteria associated with the best scoring ad group(s) can be used as "criteria" to determine a final set of ads.

A content-relevant an ad server can use the set of one or more "criteria" to request ads. The provided ads may participate in an arbitration (e.g., an auction) to place the ads in available ad spots, to provide the ads with enhanced features or treatments (e.g., enhanced colors, enhanced fonts, images, animation, etc.), etc.

There are many ways of selecting a set of ads given a set of one or more "criteria." For example, a requestor may request that an ad be sent back if K of the M criteria sent match a single ad group. One version of AdSense from Google determined a set of ads give a set of one or more criteria as follows. Suppose a list of the 60 best criteria is provided. Such criteria could be grouped into a sequence of queries, such as:

$$\text{raw\_query}_0 = \text{``crit}_0\_\text{OR\_crit}_1\_\text{OR\_crit}_2 \ldots \_\text{OR\_crit}_{15}\text{''};$$

$$\text{raw\_query}_1 = \text{``crit}_{16}\_\text{OR\_crit}_{17}\_\text{OR\_crit}_{18} \ldots \_\text{OR\_crit}_{30}\text{''};$$

$$\text{raw\_query}_2 = \text{``crit}_{31}\_\text{OR\_crit}_{32}\_\text{OR\_crit}_{33} \ldots \_\text{OR\_crit}_{45}\text{''; and}$$

$$\text{raw\_query}_3 = \text{``crit}_{46}\_\text{OR\_crit}_{47}\_\text{OR\_crit}_{48} \ldots \_\text{OR\_crit}_{60}\text{''}. \quad [1]$$

for example. Each of the queries could be processed in sequence until any ad, without regard to the number of ads, is returned. For example, raw_query$_0$ could be processed. If any ads matched any of crit$_0$ through crit$_{15}$, these ads would be returned (for subsequent processing) and the other raw queries would not be processed. If no ads were returned for raw_query$_0$, raw_query$_1$ would be processed, and so on.

Although this approach has worked well, it has room for improvement. More specifically, opportunities to fill ad spots may be lost, criteria-to-document relevancy information can be ignored (or at least diluted), and multiple requests can lead to complexity and wasted resources. Each of these limitations is addressed below.

With regard to lost opportunities to fill ad spots, by stopping the process once one of the raw_queries returns at least one ad, there is a potential for unfilled ad spots. For example, suppose that a document has six (6) ad spots (and a requestor wants six (or more) ads). Suppose further that $raw\_query_0$ (ultimately) produces no ads, but $raw\_query_1$ (ultimately) produces one ad. The process is stopped at this point and five ad spots are left unfilled. Suppose that $raw\_query_2$ would have produced 20 ads. Since $raw\_query_2$ is never processed, only one ad is shown. This is a wasted opportunity to show relevant ads, which is a lost opportunity to generate revenue for the ad serving system.

With regard to ignoring or diluting criteria-to-document relevancy information, although the groups of queries are ordered such that an earlier processed group (e.g., $raw\_query_0$) has more relevant criteria than a potentially later processed group (e.g., $raw\_query_1$, $raw\_query_2$, etc.), within a group, all criteria are treated equally. Consider, for example, $raw\_query_0$. Since the criteria have been ranked by relevancy, $crit_1$ may be much more relevant to the content of the document than $crit_9$. However, suppose that $raw\_query_0$ returns two ads—ad A and ad B. Suppose further that ad A was returned because it had a targeting criteria that matched $crit_1$, while ad B was returned because it had a targeting criteria that matched $crit_9$. Thus, ad A is more relevant to the document content than ad B. Unfortunately, however, this fact is ignored in an arbitration in which ad A and ad B compete.

Finally, with regard to complexity, processing multiple requests (e.g., a second and perhaps even a third request) leads to complexity and extra load on processing and communications resources, particularly in a distributed environment.

Accordingly, given a set of ordered criteria, it would be useful to improve an ad server to generate more ads, to generate more relevant ads, and/or to reduce the load on processing, communication and/or storage resources.

§2. SUMMARY OF THE INVENTION

Embodiments consistent with the present invention may be used to score ads eligible to be served with a document (for example, because they are relevant to the document). In at least some embodiments consistent with the present invention, each ad is scored using a price parameter associated with the ad and an indication of relevancy of the ad to the document. In at least some embodiments consistent with the present invention, the indication of relevancy of the ad to the document is based on an ordinal ranking of a relevancy criteria of the document used to select the ad, and/or a value of a relevancy criteria of the document used to select the ad.

In at least some embodiments consistent with the present invention, the eligible ads are determined by obtaining relevancy criteria for the document and selecting ads using at least some of the obtained relevancy criteria.

In at least some embodiments consistent with the present invention, the ads are selected, and perhaps filtered, in a distributed manner.

§3. BRIEF DESCRIPTION OF THE DRAWINGS

FIG. 1 is a diagram showing parties or entities that can interact with an advertising system.

FIG. 2 is a diagram illustrating an environment in which, or with which, embodiments consistent with the present invention may operate.

§4. DETAILED DESCRIPTION

Figure 3:
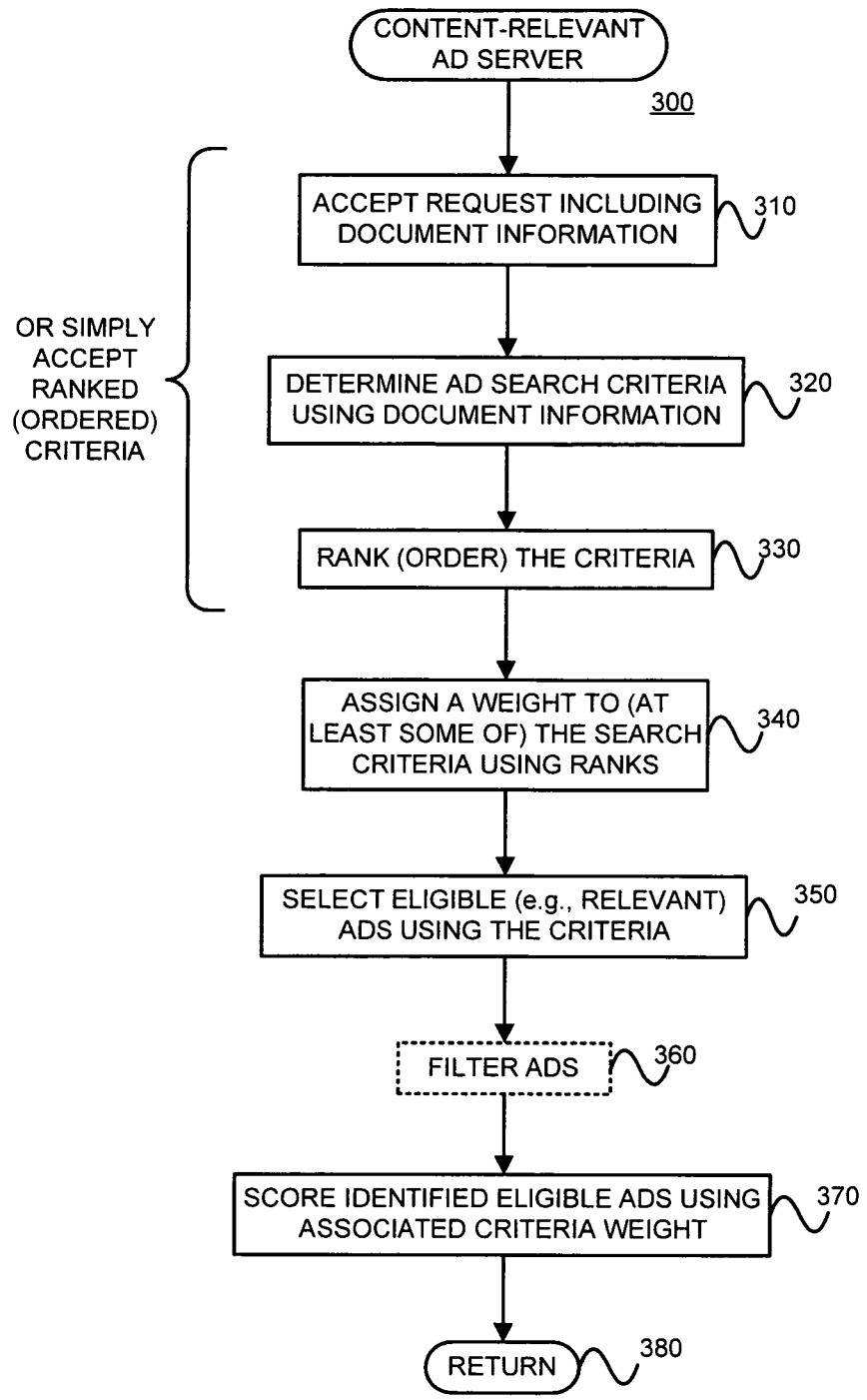
FIG. 3 is a flow diagram of an exemplary method for determining and scoring ads in a manner consistent with the present invention.

The present invention may involve novel methods, apparatus, message formats, and/or data structures for selecting and/or scoring content-relevant ads. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention to include any patentable subject matter described.

In the following definitions of terms that may be used in the specification are provided in §4.1. Then, environments in which, or with which, the present invention may operate are described in §4.2. Exemplary embodiments of the present invention are described in §4.3. Thereafter, a specific example illustrating the utility of one exemplary embodiment of the present invention is provided in §4.4. Finally, some conclusions regarding the present invention are set forth in §4.5.

§4.1 Definitions

Online ads, such as those used in the exemplary systems described below with reference to FIGS. 1 and 2, or any other system, may have various intrinsic features. Such features may be specified by an application and/or an advertiser. These features are referred to as "ad features" below. For example, in the case of a text ad, ad features may include a title line, ad text, and an embedded link. In the case of an image ad, ad features may include images, executable code, and an embedded link. Depending on the type of online ad, ad features may include one or more of the following: text, a link, an audio file, a video file, an image file, executable code, embedded information, etc.

When an online ad is served, one or more parameters may be used to describe how, when, and/or where the ad was served. These parameters are referred to as "serving parameters" below. Serving parameters may include, for example, one or more of the following: features of (including information on) a document on which, or with which, the ad was served, a search query or search results associated with the serving of the ad, a user characteristic (e.g., their geographic location, the language used by the user, the type of browser used, previous page views, previous behavior, user account, any Web cookies used by the system, user device characteristics, etc.), a host or affiliate site (e.g., America Online, Google, Yahoo) that initiated the request, an absolute position of the ad on the page on which it was served, a position (spatial or temporal) of the ad relative to other ads served, an absolute size of the ad, a size of the ad relative to other ads, a color of the ad, a number of other ads served, types of other ads served, time of day served, time of week served, time of year served, etc. Naturally, there are other serving parameters that may be used in the context of the invention.

Although serving parameters may be extrinsic to ad features, they may be associated with an ad as serving conditions or constraints. When used as serving conditions or constraints, such serving parameters are referred to simply as "serving constraints" (or "targeting criteria"). For example, in some systems, an advertiser may be able to target the serving of its ad by specifying that it is only to be served on weekdays, no lower than a certain position, only to users in a certain location, etc. As another example, in some systems, an advertiser may specify that its ad is to be served only if a page or search query includes certain keywords or phrases. As yet another example, in some systems, an advertiser may specify that its ad is to be served only if a document, on which, or with which, the ad is to be served, includes certain topics or concepts, or falls under a particular cluster or clusters, or some other classification or classifications (e.g., verticals). In some systems, an advertiser may specify that its ad is to be served only to (or is not to be served to) user devices having certain characteristics. Finally, in some systems an ad might be targeted so that it is served in response to a request sourced from a particular location, or in response to a request concerning a particular location.

"Ad information" may include any combination of ad features, ad serving constraints, information derivable from ad features or ad serving constraints (referred to as "ad derived information"), and/or information related to the ad (referred to as "ad related information"), as well as an extension of such information (e.g., information derived from ad related information).

The ratio of the number of selections (e.g., clickthroughs) of an ad to the number of impressions of the ad (i.e., the number of times an ad is rendered) is defined as the "selection rate" (or "clickthrough rate") of the ad.

A "conversion" is said to occur when a user consummates a transaction related to a previously served ad. What constitutes a conversion may vary from case to case and can be determined in a variety of ways. For example, it may be the case that a conversion occurs when a user clicks on an ad, is referred to the advertiser's Web page, and consummates a purchase there before leaving that Web page. Alternatively, a conversion may be defined as a user being shown an ad, and making a purchase on the advertiser's Web page within a predetermined time (e.g., seven days). In yet another alternative, a conversion may be defined by an advertiser to be any measurable/observable user action such as, for example, downloading a white paper, navigating to at least a given depth of a Website, viewing at least a certain number of Web pages, spending at least a predetermined amount of time on a Website or Web page, registering on a Website, etc. Often, if user actions don't indicate a consummated purchase, they may indicate a sales lead, although user actions constituting a conversion are not limited to this. Indeed, many other definitions of what constitutes a conversion are possible.

The ratio of the number of conversions to the number of impressions of the ad (i.e., the number of times an ad is rendered) and the ratio of the number of conversions to the number of selections (or the number of some other earlier event) are both referred to as the "conversion rate." The type of conversion rate will be apparent from the context in which it is used. If a conversion is defined to be able to occur within a predetermined time since the serving of an ad, one possible definition of the conversion rate might only consider ads that have been served more than the predetermined time in the past.

A "property" is something on which ads can be presented. A property may include online content (e.g., a Website, an MP3 audio program, online games, etc.), offline content (e.g., a newspaper, a magazine, a theatrical production, a concert, a sports event, etc.), and/or offline objects (e.g., a billboard, a stadium score board, and outfield wall, the side of truck trailer, etc.). Properties with content (e.g., magazines, newspapers, Websites, email messages, etc.) may be referred to as "media properties." Although properties may themselves be offline, pertinent information about a property (e.g., attribute(s), topic(s), concept(s), category(ies), keyword(s), relevancy information, type(s) of ads supported, etc.) may be available online. For example, an outdoor jazz music festival may have entered the topics "music" and "jazz", the location of the concerts, the time of the concerts, artists scheduled to appear at the festival, and types of available ad spots (e.g., spots in a printed program, spots on a stage, spots on seat backs, audio announcements of sponsors, etc.).

A "document" is to be broadly interpreted to include any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.) Ad spots in the document may be defined by embedded information or instructions. In the context of the Internet, a common document is a Web page. Web pages often include content and may include embedded information (such as meta information, hyperlinks, etc.) and/or embedded instructions (such as JavaScript, etc.). In many cases, a document has an addressable storage location and can therefore be uniquely identified by this addressable location. A universal resource locator (URL) is an address used to access information on the Internet.

A "Web document" includes any document published on the Web. Examples of Web documents include, for example, a Website or a Web page.

"Document information" may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

Content from a document may be rendered on a "content rendering application or device". Examples of content rendering applications include an Internet browser (e.g., Explorer, Netscape, Opera, Firefox, etc.), a media player (e.g., an MP3 player, a Realnetworks streaming audio file player, etc.), a viewer (e.g., an Abobe Acrobat pdf reader), etc.

A "content owner" is a person or entity that has some property right in the content of a media property (e.g., document). A content owner may be an author of the content. In addition, or alternatively, a content owner may have rights to reproduce the content, rights to prepare derivative works of the content, rights to display or perform the content publicly, and/or other proscribed rights in the content. Although a content server might be a content owner in the content of the documents it serves, this is not necessary. A "Web publisher" is an example of a content owner.

"User information" may include user behavior information and/or user profile information.

"E-mail information" may include any information included in an e-mail (also referred to as "internal e-mail information"), information derivable from information included in the e-mail and/or information related to the e-mail, as well as extensions of such information (e.g., information derived from related information). An example of information derived from e-mail information is information extracted or otherwise derived from search results returned in response to a search query composed of terms extracted from an e-mail subject line. Examples of information related to e-mail information include e-mail information about one or more other e-mails sent by the same sender of a given e-mail, or user information about an e-mail recipient. Information derived from or related to e-mail information may be referred to as "external e-mail information."

§4.2 Exemplary Advertising Environments in which, or with which, the Present Invention May Operate FIG. 1 is a diagram of an advertising environment. The environment may include an ad entry, maintenance and delivery system (simply referred to as an ad server) 120. Advertisers 110 may directly, or indirectly, enter, maintain, and track ad information in the system 120. The ads may be in the form of graphical ads such as so-called banner ads, text only ads, image ads, audio ads, video ads, ads combining one of more of any of such components, etc. The ads may also include embedded information, such as a link, and/or machine executable instructions. Ad consumers 130 may submit requests for ads to, accept ads responsive to their request from, and provide usage information to, the system 120. An entity other than an ad consumer 130 may initiate a request for ads. Although not shown, other entities may provide usage information (e.g., whether or not a conversion or selection related to the ad occurred) to the system 120. This usage information may include measured or observed user behavior related to ads that have been served.

The ad server 120 may be similar to the one described in the '900 application. An advertising program may include information concerning accounts, campaigns, creatives, targeting, etc. The term "account" relates to information for a given advertiser (e.g., a unique e-mail address, a password, billing information, etc.). A "campaign" or "ad campaign" refers to one or more groups of one or more advertisements, and may include a start date, an end date, budget information, geo-targeting information, syndication information, etc. For example, Honda may have one advertising campaign for its automotive line, and a separate advertising campaign for its motorcycle line. The campaign for its automotive line may have one or more ad groups, each containing one or more ads. Each ad group may include targeting information (e.g., a set of keywords, a set of one or more topics, etc.), and price information (e.g., cost, average cost, or maximum cost (per impression, per selection, per conversion, etc.)). Therefore, a single cost, a single maximum cost, and/or a single average cost may be associated with one or more keywords, and/or topics. As stated, each ad group may have one or more ads or "creatives" (That is, ad content that is ultimately rendered to an end user.). Each ad may also include a link to a URL (e.g., a landing Web page, such as the home page of an advertiser, or a Web page associated with a particular product or server). Naturally, the ad information may include more or less information, and may be organized in a number of different ways.

FIG. 2 illustrates an environment 200 in which the present invention may be used. A user device (also referred to as a "client" or "client device") 250 may include a browser facility (such as the Explorer browser from Microsoft, the Opera Web Browser from Opera Software of Norway, the Navigator browser from AOL/Time Warner, the Firefox browser from Mozilla, etc.), an e-mail facility (e.g., Outlook from Microsoft), etc. A search engine 220 may permit user devices 250 to search collections of documents (e.g., Web pages). A content server 230 may permit user devices 250 to access documents. An e-mail server (such as GMail from Google, Hotmail from Microsoft Network, Yahoo Mail, etc.) 240 may be used to provide e-mail functionality to user devices 250. An ad server 210 may be used to serve ads to user devices 250. The ads may be served in association with search results provided by the search engine 220. However, content-relevant ads may be served in association with content provided by the content server 230, and/or e-mail supported by the e-mail server 240 and/or user device e-mail facilities.

As discussed in the '900 application, ads may be targeted to documents served by content servers. Thus, one example of an ad consumer 130 is a general content server 230 that receives requests for documents (e.g., articles, discussion threads, music, video, graphics, search results, Web page listings, etc.), and retrieves the requested document in response to, or otherwise services, the request. The content server may submit a request for ads to the ad server 120/210. Such an ad request may include a number of ads desired. The ad request may also include document request information. This information may include the document itself (e.g., page), a category or topic corresponding to the content of the document or the document request (e.g., arts, business, computers, arts-movies, arts-music, etc.), part or all of the document request, content age, content type (e.g., text, graphics, video, audio, mixed media, etc.), geo-location information, document information, etc.

The content server 230 may combine the requested document with one or more of the advertisements provided by the ad server 120/210. This combined information including the document content and advertisement(s) is then forwarded towards the end user device 250 that requested the document, for presentation to the user. Finally, the content server 230 may transmit information about the ads and how, when, and/or where the ads are to be rendered (e.g., position, selection or not, impression time, impression date, size, conversion or not, etc.) back to the ad server 120/210. Alternatively, or in addition, such information may be provided back to the ad server 120/210 by some other means.

The offline content provider 232 may provide information about ad spots in an upcoming publication, and perhaps information about the publication (e.g., the content or topics or concepts of the content), to the ad server 210. In response, the ad server 210 may provide a set of ads relevant the content of the publication for at least some of the ad spots. Examples of offline content providers 232 include, for example, magazine publishers, newspaper publishers, book publishers, offline music publishers, offline video game publishers, a theatrical production, a concert, a sports event, etc.

Owners of the offline ad spot properties 234 may provide information about ad spots in their offline property (e.g., a stadium scoreboard banner ad for an NBA game in San Antonio, Tex.). In response, the ad sever may provide a set of ads relevant to the property for at least some of the ad spots. Examples of offline properties 234 include, for example, a billboard, a stadium score board, and outfield wall, the side of truck trailer, etc.

Another example of an ad consumer 130 is the search engine 220. A search engine 220 may receive queries for search results. In response, the search engine may retrieve relevant search results (e.g., from an index of Web pages). An exemplary search engine is described in the article S. Brin and L. Page, "The Anatomy of a Large-Scale Hypertextual Search Engine," *Seventh International World Wide Web Conference*, Brisbane, Australia and in U.S. Pat. No. 6,285,999 (both incorporated herein by reference). Such search results may include, for example, lists of Web page titles, snippets of text extracted from those Web pages, and hypertext links to those Web pages, and may be grouped into a predetermined number of (e.g., ten) search results.

The search engine 220 may submit a request for ads to the ad server 120/210. The request may include a number of ads desired. This number may depend on the search results, the amount of screen or page space occupied by the search results, the size and shape of the ads, etc. In one embodiment, the number of desired ads will be from one to ten, and preferably from three to five. The request for ads may also include the query (as entered or parsed), information based on the query (such as geolocation information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., Web pages), full text of identified documents, topics of identified documents, feature vectors of identified documents, etc.

The search engine 220 may combine the search results with one or more of the advertisements provided by the ad server 120/210. This combined information including the search results and advertisement(s) is then forwarded towards the user that submitted the search, for presentation to the user. Preferably, the search results are maintained as distinct from the ads, so as not to confuse the user between paid advertisements and presumably neutral search results.

Finally, the search engine 220 may transmit information about the ad and when, where, and/or how the ad was to be rendered (e.g., position, selection or not, impression time, impression date, size, conversion or not, etc.) back to the ad server 120/210. Alternatively, or in addition, such information may be provided back to the ad server 120/210 by some other means.

Finally, the e-mail server 240 may be thought of, generally, as a content server in which a document served is simply an e-mail. Further, e-mail applications (such as Microsoft Outlook for example) may be used to send and/or receive e-mail. Therefore, an e-mail server 240 or application may be thought of as an ad consumer 130. Thus, e-mails may be thought of as documents, and targeted ads may be served in association with such documents. For example, one or more ads may be served in, under, over, or otherwise in association with an e-mail.

Although the foregoing examples described servers as (i) requesting ads, and (ii) combining them with content, one or both of these operations may be performed by a client device (such as an end user computer for example).

§4.3 Exemplary Embodiments

§4.3.1 Exemplary Methods

FIG. 3 is a flow diagram of an exemplary method 300 for selecting and scoring ads in a manner consistent with the present invention. A request including document information is accepted. (Block 310) Then, ad search criteria may be determined using the accepted document information. (Block 320) The determined criteria may be ranked. (Block 330) For at least some of the criteria (e.g., at least two of the criteria), a weight may be assigned using the rankings. (Block 340) Eligible ads are selected (e.g., identified) using the criteria. (Block 350) The number of eligible ads may be decreased (e.g., using filtering). (Block 360) The identified eligible ads may then be scored using their associated criteria weights (Block 370) before the method 300 is left (Node 380).

Referring back to block 310, the request may specify the number of ads desired. The request may specify a type of ad (e.g., text only, audio, video, image, etc.) desired. The document information may be a document identifier. For example, in the context of the Web, the document information may be a URL. Alternatively, or in addition, the document information may include content (extracted) from the document. Alternatively, or in addition, the document information may include topics or concepts (e.g., PHIL clusters) of the document content.

Referring back to blocks 310-330, these acts may be performed as described in §1.2 above with reference to the '900 application. Other means of determining ranked criteria may be used. Indeed, ranked criteria may simply be accepted.

Referring back to block 340, the criteria weights for each criteria may be based on how relevant that criteria is to the document. For example, a criteria weight for criteria i ($cw_i$) may be determined using the formula:

$$cw_i = MAC^i \quad [2]$$

where MAC (Modified Arbitration Constant) is between 1.0 and 0.0. The MAC can be selected as desired. For example, tuning the MAC may be used to tune the relative importance of click through rate ("CTR") and cost per click ("CPC") when scoring the ads (e.g., for use in an arbitration or auction). When the MAC is increased, the arbitration becomes more competitive—the importance of a CPC offer and CTR increases, but better criteria lose some of their advantage. Conversely, when the MAC is decreased, the arbitration becomes less competitive—the importance of a CPC offer and CTR decreases, and more relevant criteria gain an advantage.

Referring back to block 350, a request used for identifying ads may include N (e.g., N=29) criteria. The request may take the form of a query such as:

$$\text{raw\_query} = \text{"crit}_0\_OR\_crit_1\_OR\_crit_2 \ldots \_OR\_crit_N\text{"} \quad [3]$$

$$\text{criteria\_weights} = \{cw_0, cw_1, cw_2, \ldots cw_N\} \quad [4]$$

Using this request, ads for each of the $crit_i$ may be determined. In at least some embodiments consistent with the present invention, if an $AD_j$ is selected due to $crit_i$ that ad is assigned $cw_i$. In at least some embodiments consistent with the present invention, if an ad is, or could have been, selected due to more than one criteria, it is given the higher of the two criteria weights. Thus, when the ads are passed back to the request source, each ad may include a criteria weight.

Referring back to block 370, the ads may be scored such that the score reflects an estimated cost per impression. This may be done using the following:

$$eCPM_j = CTR_j * CPC_j * CW_j \qquad [5]$$

Suppose that this eCPM score is used in an ad arbitration to determine a placement order of eligible ads. Suppose that $AD_j$ and $AD_k$ have the same CTR, but $CW_j=0.5$, while $CW_k=1.0$. This means that for $AD_j$ to appear before $AD_k$, it must pay twice as much in CPC, or to put it another way, $AD_j$ can beat $AD_k$ with half the CPC.

§4.3.2 Exemplary Distributed Architecture

Figure 4:
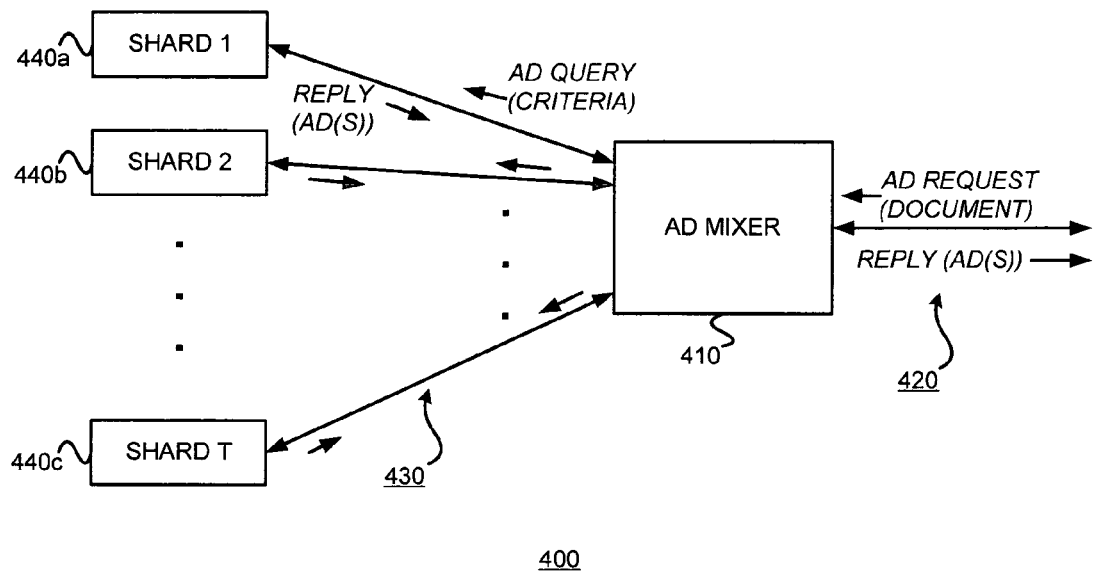
FIG. 4 is a block diagram illustrating a distributed ad serving system.

FIG. 4 is a block diagram illustrating an exemplary distributed ad serving system 400 provided in a manner consistent with the present invention. In the exemplary system 400, an ad mixer 410 receives an ad request including document information. Using the document information, the ad mixer 410 determines ad criteria and broadcasts a query, including at least some of the criteria, to T (e.g., T=2 to 100, and in some embodiments (about) 20 to 80) shards 440. The number of shards may be a function of the amount of advertiser information stored on each shard, as well as the storage capacity of each shard. Each of the shards 440 has access to different sets of ad information, and returns, to the ad mixer 410, a reply with ad(s) matching one or more of the criteria of the query. The ad mixer 410 may then select a final set of one or more ads to be provided in a reply. As can be appreciated from the foregoing, shards 2-T 440 can operate on a request in parallel, considering different sets of ad information.

Alternatively, the ad mixer 410 need not determine the criteria itself. For example, the criteria may have been provided in the ad request, or may be determined by another component (not shown). In either case, the ad mixer 410 might weight a set of rank ordered criteria.

Figure 5:
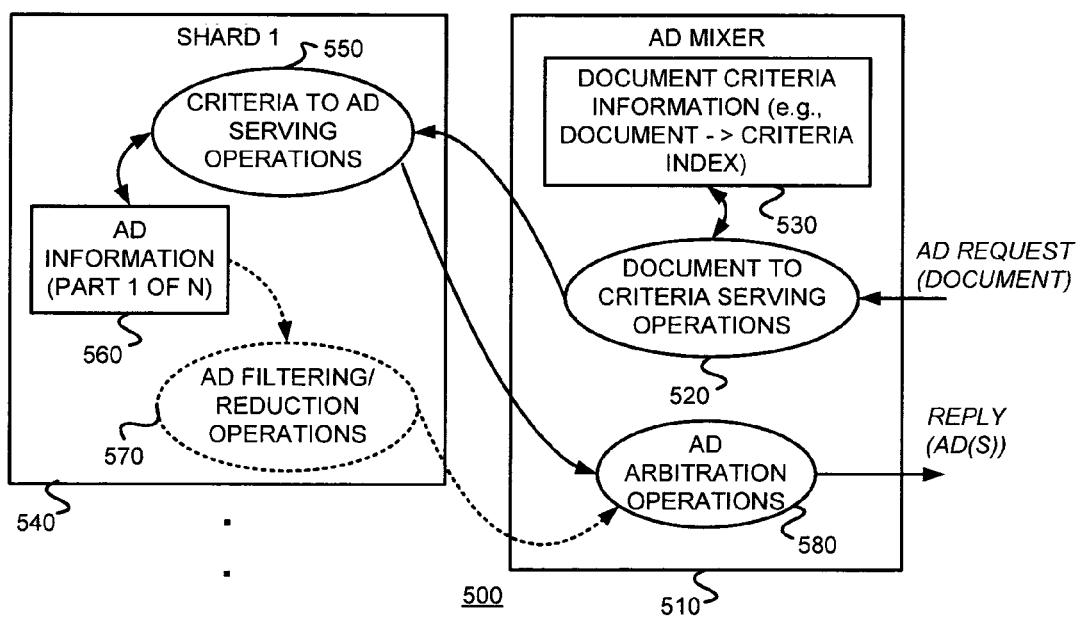
FIG. 5 is a bubble diagram of exemplary operations that may be performed in a manner consistent with the present invention, as well as information that may be used and/or generated by such operations, in a distributed ad serving system.

FIG. 5 is a bubble diagram of exemplary operations that may be performed in a manner consistent with the present invention, as well as information that may be used and/or generated by such operations, in a distributed ad serving system such as that 400 of FIG. 4. For simplicity, only one exemplary shard 540 is illustrated. An exemplary ad mixer 510 may include document to criteria serving operations 520, ad arbitration operations 580, and document criteria information 530. Each shard 540 may include criteria to ad serving operations 550 and ad information 560. Each shard 540 may also include ad filtering/reduction operations 570.

Still referring to FIG. 5, an ad request including document information may be received by document to criteria serving operations 520. These operations 520 may use the document information to obtain criteria using document criteria information 530. For example, the document information in the request may be (or include) a document identifier (e.g., a URL of a Webpage) and the document criteria information 530 may be an index mapping document identifiers to one or more criteria. That is, in at least one embodiment consistent with the present invention, the document to serving criteria operations 520 may use a document identifier, provided in an ad request, to lookup criteria related to the document. The criteria may have been sorted (rank ordered). Criteria weights may have been previously determined and stored with the criteria, or may be determined as needed. The document to criteria serving operations 520 may then generate an ad query including at least some of the criteria, perhaps with criteria weights as discussed above. These operations 520 may then broadcast the ad query to a plurality of shards (only one 540 shown). As discussed above with reference to block 350 of FIG. 3, the request may take the form of a query such as:

raw_query="$crit_0$_OR_$crit_1$_OR_$crit_2$ ... _OR_$crit_N$"

criteria_weights={$cw_0, cw_1, cw_2, \ldots cw_N$}

In each of the plurality of shards 540, criteria to ad serving operations 550 may determine relevant ads using the criteria and ad information 560. As discussed above, in at least some embodiments consistent with the present invention, if an ad $AD_j$ is selected due to the $crit_i$, then that ad is assigned $cw_i$. In at least some embodiments consistent with the present invention, if an ad is, or could have been, selected due to more than one criteria, it is given the higher of the two criteria weights. Each of the various shards 540 may pass zero or more ads responsive to the request, back to ad arbitration operations 580 of the ad mixer 510. Thus, when the ads are passed back to the request source, each ad may include a criteria weight.

Still referring to FIG. 5, optional ad filtering/reduction operations 570 may be provided at each of the shards 540. Such operations 570 may be used to reduce (e.g., under certain conditions) the number of ads returned to the ad mixer 510. For example, such filtering may be performed using one or more of ad CTR, ad criteria weight, a number of requested ads (if known), the number of shards, etc. Basically, any factor that is used in ad arbitration operations 580 of the ad mixer may be used to filter/reduce ads at each shard 540. The rationale for such filtering/reduction is to conserve processing, communication, and/or storage resources by avoiding further consideration of ads that will likely compete poorly in a later arbitration. For example, if an ad has a low CPC, a low CTR and/or a low CW, and if there is only a small number of ads to be considered, then it may be advisable not to even bother sending the ad from the shard 540 to the ad mixer 510 since it is unlikely to be provided in the final set of ads to be served.

Referring back to the ad mixer 510, ad arbitration operations 580 may score the ad(s) returned. Such scores of ad may be used in determining whether or not to serve ads, and/or how to serve the ads (e.g., in terms of relative or absolute placement, in terms of relative or absolute treatment, etc.). As discussed above with reference to block 370 of FIG. 3, the ads may be scored such that the score reflects an estimated cost per impression. This may be done using the following:

$$eCPM_j = CTR_j * CPC_j * CW_j$$

§4.3.3 Exemplary Apparatus

Figure 6:
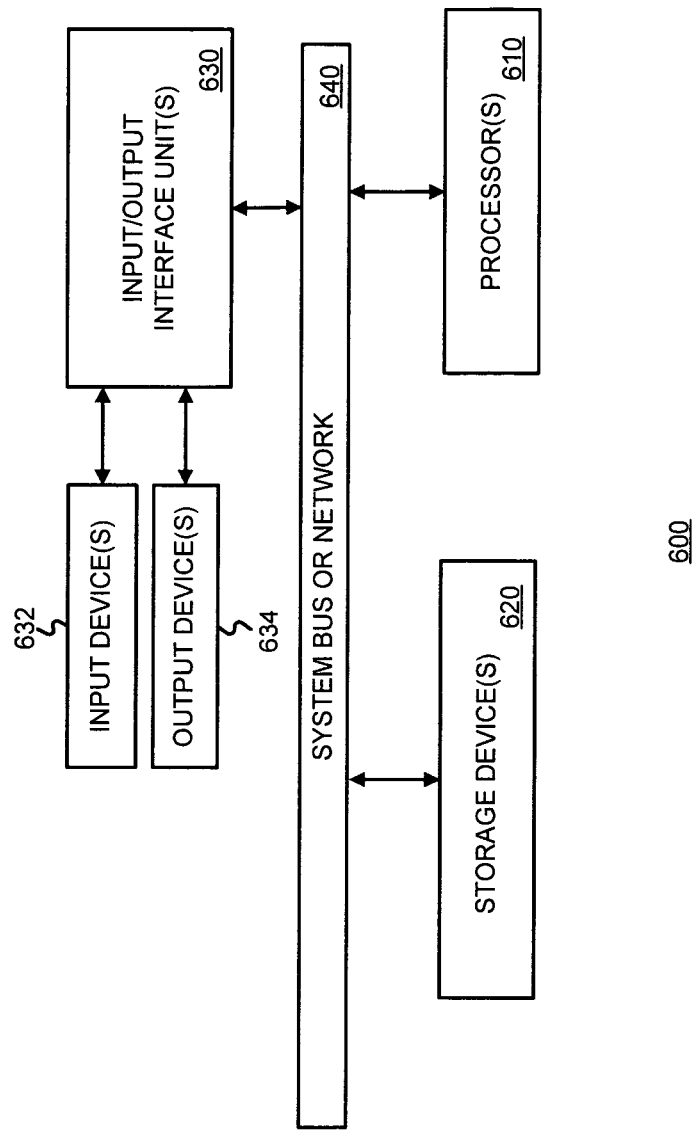
FIG. 6 is a block diagram of apparatus that may be used to perform at least some operations, and store at least some information, in a manner consistent with the present invention.

FIG. 6 is a block diagram of apparatus 600 that may be used to perform at least some operations, and store at least some information, in a manner consistent with the present invention. The apparatus 600 basically includes one or more processors 610, one or more input/output interface units 630, one or more storage devices 620, and one or more system buses and/or networks 640 for facilitating the communication of information among the coupled elements. One or more input devices 632 and one or more output devices 634 may be coupled with the one or more input/output interfaces 630.

The one or more processors 610 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to perform one or more aspects of the present invention. At least a portion of the machine executable instructions may be stored (temporarily or more permanently) on the one or more storage devices 620 and/or may be received from an external source via one or more input interface units 630.

In one embodiment, the machine 600 may be one or more conventional personal computers. In this case, the processing units 610 may be one or more microprocessors. The bus 640 may include a system bus. The storage devices 620 may include system memory, such as read only memory (ROM) and/or random access memory (RAM). The storage devices 620 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 632, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 610 through an appropriate interface 630 coupled to the system bus 640. The output devices 634 may include a monitor or other type of display device, which may also be connected to the system bus 640 via an appropriate interface. In addition to (or instead of) the monitor, the personal computer may include other (peripheral) output devices (not shown), such as speakers and printers for example.

Referring back to FIG. 2, one or more machines 600 may be used as end user client devices 250, content servers 230, search engines 220, email servers 240, and/or ad servers 210. Referring back to FIG. 4, one or more machines 600 may be used as an ad mixer 410 and each of two or more shards 440. In at least some exemplary embodiments consistent with the present invention, the ad mixer 410 and the shards 440 may be coupled via a switch (or switches). In such embodiments, there might be no dedicated link or connection between each of the shards 440 and the ad mixer 410. Consequently, information (e.g., in packets or cells) might be dropped (e.g., due to network congestion and switch port contention). Thus, reducing the number of queries might be advantageous.

§4.3.4 Refinements and Alternatives

Although the exemplary criteria weight determination techniques described above based the criteria weight solely on the rank of the criteria, an actual relevancy score of the criteria to the document (and/or ad) may be used instead of, or in addition to, rank when determining the criteria weight.

Although the exemplary arbitration described above used a product of CTR, CPC and CW, other factors may be used instead of, or in addition to CTR and CPC. For example, in a pay per impression scheme, the score may be the product of CW and cost per (thousand) impression(s).

Referring back to the distributed system 400 of FIG. 4, the main drawback of using a distributed approach is that the shards 440 might process all of the criteria and return all the ads for all of these criteria at once. This can adversely affect the ad mixer 410, shards 440 and the communications link(s) between them (e.g., in terms of CPU load, network load and latency, etc.). On or more of the following refinements may be used to mitigate such adverse affects.

First, some form of compression (e.g., zlib) may be used to compress the communications between the ad mixer 410 and the shards 440 to limit the amount of network bandwidth.

Second, in at least some embodiments consistent with the present invention, the ad mixer 410 may filter ads (e.g., using publisher-specific (or document source-specific) filters. For queries wherein large numbers of ads are not expected to be filtered in the ad mixer 410 (e.g., due to lack of filter(s)), the shards 440 might be instructed to limit (e.g., the number of) the ads returned. For example, each shard 440 may be instructed to only return an ad or ads with the R (e.g., R=1 to 100, and in some embodiments 1 to 40) highest predicted eCPMs. This refinement may be used to cap the amount of data that each shard 440 can send to the ad mixer 410. Alternatively, or in addition, the shards 440 may be provided with constraints (e.g., a threshold predicted eCPM) that may, in effect, reduce the number of ads returned by the shards 440.

Since such embodiments might require an eCPM determination at the shards 440, the shards might pass the eCPM value(s) to the ad mixer 410 so that the ad mixer doesn't need to re-determine it or them. That is in some embodiments, the eCPM determination may be distributed to the shards 440. However, in at least some embodiments consistent with the present invention, the ad mixer 410 might have access to a better estimate of ad CTRs than the shards 440. In such a case, it might be desirable to have each shard 440 (or the shards 440 to collectively) return more candidate ads than requested by the document publisher. That is, since there is a potential for discrepancies between eCPMs as determined by a shard 440 and the ad mixer 410 (due to different CTR data or estimates), if the ad shards 440 returned too few (or just enough) ads, the likelihood of having a suboptimal set of ads (due to the shard 440 using a sub-optimal estimate of CTR) increases.

Third, in at least some embodiments consistent with the present invention, most of the filtering of ads (e.g., based on per-document publisher or per-document policies such as competitor filtering, filtering ads with inappropriate text, etc.) is done in the ad mixer 410. As discussed above with reference to element 570 of FIG. 5, at least some of this filtering may be moved to the shards 440. This refinement can be used to reduce the number of ads that need to be sent to the ad mixer 410, thereby saving CPU resource of the ad mixer 410 and communications resources of link(s) between the shards 440 and the ad mixer 410.

§4.4 Example of Operations in an Exemplary Embodiment Consistent with the Present Invention The following example contrasts the operations of an exemplary embodiment consistent with the present invention with an ad auction that uses a simple score which is a product of CTR and CPC. Suppose that a Webpage includes an article on caring for the German Sheppard breed of dogs and has two available ad spots, the first ad spot being preferred over the second. Suppose further that the Webpage criteria are ordered as follows:

$c_1$ "german sheppard";
$c_2$ dog;
$c_3$ pets;
$c_4$ veterinarian; and
$c_5$ vaccination.

Suppose further that the criteria weight (CW) for each criteria is determined in accordance with equation [2] above, and that MAC is set to 0.5. Thus, the criteria weights would be:

$cw_1=0.5$;
$cw_2=0.25$;
$cw_3=0.125$;
$cw_4=0.0625$; and
$cw_5=0.03125$.

Finally, suppose that there are three (3) ads with the following targeting keywords (KWs), CTRs, and CPCs:

| | | |
|---|---|---|
| AD1 KWs: t-shirt, "german sheppard, dog | CTR: 0.045 | CPC: $0.25 |
| AD2 KWs: veterinarian | CTR: 0.04 | CPC: $1.75 |
| AD3 KWs: vaccine, flu | CTR: 0.06 | CPC: $2.00 |

If the ads are score in accordance with equation [5] above, the scores will be as follows:

AD1score=0.045*$0.25*max(0.5, 0.25)=0.005625
AD2score=0.04*$1.75*0.0625=0.004375
AD3score=0.06$2.000.03125=0.00375

Under this example, AD1 would be served in the first ad spot, AD2 would be served in the second ad spot, and AD3 would not be served.

In this example, the first criteria (c1) gets a $0.5^4$ advantage over the fifth criteria (c5). Assuming that two ads had the same CTR, an ad triggered by the fifth criteria (and none higher) would have to pay 16 times as much as an ad triggered by the first criteria.

To contrast the outcome under this example, consider a previous scoring methodology that simply determines the produce of CTR and CPC. Under such a scoring methodology, the scores would be as follows:

AD1score=0.045*$0.25=0.01125
AD2score=0.04*$1.75=0.07
AD3score=0.06*$2.00=0.12

Thus, under the previous scoring methodology, AD3 would be served in the first ad spot, AD2 would again be served in the second ad spot, and AD1 would not be served.

§4.5 Conclusions

As can be appreciated from the foregoing, embodiments consistent with the present invention improve over other ad arbitration techniques in that they account for how well the document content matches criteria used to find relevant ads. The relevance of the criteria to the document content may be represented by $cw_i$. Further, more ad spots may be filled and competition for ad spots may increase. Moreover, at least some embodiments consistent with the present invention can reduce processor, communications, and/or storage resources used when determining content-relevant ads to be served with a document.

What is claimed is:

1. A computer-implemented method comprising:
   a) receiving, using a computer system including at least one computer, advertisement search criteria about a document;
   b) assigning a criteria weight to each advertisement search criterion based on relevancy of the advertisement search criterion to the document;
   c) selecting advertisements corresponding to the advertisement search criteria;
   d) associating each selected advertisement with the criteria weight of the corresponding advertisement search criterion for that selected advertisement;
   e) determining, using the computer system, a score for each of the selected advertisements based on a product of a price parameter associated with the advertisement and the criteria weight associated with the advertisement, each determined score representing a value associated with a placement order of the selected advertisements;
   f) identifying available spaces on the document based on information from a source, the information indicating at least one certain space of the available spaces on the document for placing an advertisement, wherein the at least one certain space is preferred over other ones of the available spaces on the document; and
   g) controlling, using the computer system, placement of at least some of the selected advertisements on the document by arbitrating among the selected advertisements for the available spaces on the document based on the determined scores.

2. The computer-implemented method of claim 1, further comprising ranking the advertisement search criteria based on their relevancy to the document.

3. The computer-implemented method of claim 2, further comprising determining the criteria weight for each advertisement search criterion based on the ranking.

4. The computer-implemented method of claim 1 wherein at least one advertisement search criterion relates to the content of the document.

5. The computer-implemented method of claim 1 wherein the computer system selects an advertisement by determining if it matches any of the advertisement search criteria, and associates the selected advertisement with the highest criteria weight of all matched advertisement search criteria.

6. The computer-implemented method of claim 1, further comprising:
   i) broadcasting a query including at least some of the advertisement search criteria to a plurality of advertisement determination facilities,
   ii) determining, at each of the advertisement determination facilities, advertisements using at least some of the advertisement search criteria,
   iii) filtering the determined advertisements to generate a reduced set of advertisements, and
   iv) sending, from each of the advertisement determination facilities, the reduced set of advertisements.

7. The computer-implemented method of claim 1 wherein the price parameter associated with the advertisement is one of an offer per impression, an offer per selection, an offer per conversion, a maximum offer per impression, a maximum offer per selection and a maximum offer per conversion.

8. The computer-implemented method of claim 1 wherein the computer system determines relevancy of the advertisements to the document by:
   determining concepts of the document,
   determining a set of one or more advertisements with the determined concepts, and
   obtaining targeting information from at least some advertisements belonging to the set of one or more advertisements.

9. The computer-implemented method of claim 8 wherein the targeting information includes one or more targeting keywords.

10. The computer-implemented method of claim 8 wherein the concepts are probabilistic hierarchical inferential learned clusters.

11. The computer-implemented method of claim 1 wherein the computer system scores each of the selected advertisements by further using a performance parameter associated with the advertisement.

12. The computer-implemented method of claim 11 wherein the performance parameter associated with each advertisement is one of a selection rate and a conversion rate.

13. The computer-implemented method of claim 11 wherein the computer system scores each of the selected advertisements based on the product of the price parameter and the criteria weight with the performance parameter associated with the advertisement.

14. The computer-implemented method of claim 11 further comprising:

i) broadcasting a query including at least some of the advertisement search criteria to a plurality of advertisement determination facilities, ii) determining, at each of the advertisement determination facilities, advertisements using at least some of the advertisement search criteria, iii) filtering the determined advertisements to generate a reduced set of advertisements, and iv) sending, from each of the advertisement determination facilities, the reduced set of advertisements.

15. The computer-implemented method of claim 14 wherein each of the advertisement determination facilities filters the determined advertisements by scoring each of the determined advertisements based on the product of the price parameter and the criteria weight with the performance parameter associated with the advertisement.

16. Apparatus comprising:
a) at least one processor; and
b) at least one storage device storing processor executable instructions which, when executed by the at least one processor, perform a method including:
   i) receiving advertisement search criteria about a document;
   ii) assigning a criteria weight to each advertisement search criterion based on relevancy of the advertisement search criterion to the document;
   iii) selecting advertisements corresponding to the advertisement search criteria;
   iv) associating each selected advertisement with the criteria weight of the corresponding advertisement search criterion for that selected advertisement;
   v) determining a score for each of the selected advertisements based on a product of a price parameter associated with the advertisement and the criteria weight associated with the advertisement, each determined score representing a value associated with a placement order of the selected advertisements;
   vi) identifying available spaces on the document based on information from a source, the information indicating at least one certain space of the available spaces on the document for placing an advertisement, wherein the at least one certain space is preferred over other ones of the available spaces on the document; and
   vii) controlling placement of at least some of the selected advertisements on the document by arbitrating among the selected advertisements for the available spaces on the document based on the determined scores.

17. The computer-implemented method of claim 6 wherein each of the plurality of advertisement determination facilities is a shard.

18. A computer-implemented method comprising:
a) receiving, using a computer system including at least one computer, advertisement search criteria about a document;
b) assigning a criteria weight to each advertisement search criterion based on relevancy of the advertisement search criterion to the document;
c) selecting advertisements corresponding to the advertisement search criteria;
d) associating each selected advertisement with the criteria weight of the corresponding advertisement search criterion for that selected advertisement;
e) determining, using the computer system, a score for each of the selected advertisements based on a product of a price parameter associated with the advertisement, a performance parameter associated with the advertisement, and the criteria weight associated with the advertisement, each determined score representing a value associated with a placement order of the selected advertisements;
f) identifying available spaces on the document based on information from a source, the information indicating at least one certain space of the available spaces on the document for placing an advertisement, wherein the at least one certain space is preferred over other ones of the available spaces on the document; and
g) controlling, using the computer system, placement of at least some of the selected advertisements on the document by arbitrating among the selected advertisements for the available spaces on the document based on the determined scores.

19. A tangible, non-transitory computer readable medium storing processor executable instructions, which, when executed by at least one processor, cause the at least one processor to perform a method including:
   i) receiving advertisement search criteria about a document;
   ii) assigning a criteria weight to each advertisement search criterion based on relevancy of the advertisement search criterion to the document;
   iii) selecting advertisements corresponding to the advertisement search criteria;
   iv) associating each selected advertisement with the criteria weight of the corresponding advertisement search criterion for that selected advertisement;
   v) determining a score for each of the selected advertisements based on a product of a price parameter associated with the advertisement and the criteria weight associated with the advertisement, each determined score representing a value associated with a placement order of the selected advertisements;
   vi) identifying available spaces on the document based on information from a source, the information indicating at least one certain space of the available spaces on the document for placing an advertisement, wherein the at least one certain space is preferred over other ones of the available spaces on the document; and
   vii) controlling placement of at least some of the selected advertisements on the document by arbitrating among the selected advertisements for the available spaces on the document based on the determined scores.

20. The method of claim 1, further comprising determining a placement priority of a first and second advertisement from the selected advertisements, wherein the first and second advertisements have corresponding scores.

21. The method of claim 20, wherein determining the placement priority comprises determining an amount an advertiser associated with a given advertisement must pay in order for the given advertisement to appear before another advertisement on the document based on the criteria weight associated with each advertisement.

* * * * *